United States Patent
Neef et al.

(10) Patent No.: US 11,938,435 B2
(45) Date of Patent: Mar. 26, 2024

(54) ROUND FILTER ELEMENT, IN PARTICULAR FOR GAS FILTRATION

(71) Applicant: MANN+HUMMEL GmbH, Ludwigsburg (DE)

(72) Inventors: Pascal Neef, Trossingen (DE); Irmgard Thalmann, Waiblingen (DE)

(73) Assignee: MANN+HUMMEL GmbH, Ludwigsburg (DE)

(*) Notice: Subject to any disclaimer, the term of this patent is extended or adjusted under 35 U.S.C. 154(b) by 719 days.

(21) Appl. No.: 17/081,075

(22) Filed: Oct. 27, 2020

(65) Prior Publication Data
US 2021/0039031 A1 Feb. 11, 2021

Related U.S. Application Data

(63) Continuation of application No. PCT/EP2019/060565, filed on Apr. 25, 2019.

(30) Foreign Application Priority Data

Apr. 27, 2018 (DE) ...................... 10 2018 110 192.9

(51) Int. Cl.
*B01D 46/16* (2006.01)
*B01D 46/24* (2006.01)
*B01D 46/52* (2006.01)
*B01D 46/62* (2022.01)

(52) U.S. Cl.
CPC ......... *B01D 46/2414* (2013.01); *B01D 46/16* (2013.01); *B01D 46/521* (2013.01);
(Continued)

(58) Field of Classification Search
CPC ............ B01D 46/0005; B01D 46/2403; B01D 46/2414; B01D 46/4227; B01D 46/521;
(Continued)

(56) References Cited

U.S. PATENT DOCUMENTS 7,887,701 B2   2/2011 Schmid et al.
8,216,332 B2 * 7/2012 Kopec .................... B01D 46/42
                                                          55/498
(Continued)

FOREIGN PATENT DOCUMENTS

DE         1955789 A1    5/1971
DE    102014007411 A1   12/2014
(Continued)

*Primary Examiner* — Minh Chau T Pham (57) ABSTRACT

A round filter element has a filter medium body flowed through by a fluid to be purified in radial direction relative to a longitudinal axis of the filter medium body. The filter medium body radially encloses an inwardly positioned flow space. An end disk is arranged at an end face of the filter medium body. The end disk has a shaped body axially delimiting the inwardly positioned flow space. The end disk has a sealing disk arranged externally at the shaped body, wherein the sealing disk covers the shaped body and the end face of the filter medium body. The shaped body has a receiving depression that is flow-tight relative to the inwardly positioned flow space. The sealing disk has a receiving opening aligned with the receiving depression of the shaped body. The receiving depression and the receiving opening can receive a support element of a filter housing.

16 Claims, 7 Drawing Sheets

(52) U.S. Cl.
CPC ........ *B01D 46/62* (2022.01); *B01D 2265/021* (2013.01); *B01D 2267/40* (2013.01); *B01D 2271/02* (2013.01); *B01D 2275/208* (2013.01); *B01D 2279/60* (2013.01)

(58) Field of Classification Search
CPC ......... F02M 35/0201; F02M 35/02416; F02M 35/02483
USPC ...................... 55/385.3, 498, 502; 123/198 E
See application file for complete search history.

(56) References Cited

U.S. PATENT DOCUMENTS

| | | | |
|---|---|---|---|
| 9,086,038 B2 * | 7/2015 | Sroka | F02M 35/02483 |
| 9,440,173 B2 * | 9/2016 | Ohashi | B01D 46/0002 |
| 10,029,198 B2 * | 7/2018 | Adamek | B01D 46/0004 |
| 11,192,057 B2 * | 12/2021 | Neef | B01D 46/2414 |
| 11,400,403 B2 * | 8/2022 | Meffert | F02M 35/02425 |
| 11,504,664 B2 * | 11/2022 | Bessone | B01D 46/0005 |
| 11,648,502 B2 * | 5/2023 | Yu | B01D 39/2065 95/90 |
| 2005/0166561 A1 * | 8/2005 | Schrage | B01D 46/525 55/498 |
| 2006/0086075 A1 | 4/2006 | Scott et al. | |
| 2012/0317939 A1 | 12/2012 | Kaufmann et al. | |
| 2013/0232934 A1 | 9/2013 | Baseotto | |
| 2016/0144310 A1 | 5/2016 | Movia | |
| 2019/0308125 A1 | 10/2019 | Neef et al. | |

FOREIGN PATENT DOCUMENTS

| | | |
|---|---|---|
| DE | 102013015143 A1 | 3/2015 |
| WO | 9612550 A1 | 5/1996 |

* cited by examiner

ROUND FILTER ELEMENT, IN PARTICULAR FOR GAS FILTRATION

CROSS-REFERENCE TO RELATED APPLICATIONS

This application is a continuation application of international application No. PCT/EP2019/060565 having an international filing date of 25 Apr. 2019 and designating the United States, the international application claiming a priority date of 27 Apr. 2018 based on prior filed German patent application No. 10 2018 110 192.9, the entire contents of the aforesaid international application and the aforesaid German patent application being incorporated herein by reference.

BACKGROUND OF THE INVENTION

The invention concerns a round filter element, in particular for gas filtration, for example, for an air filter, with a filter medium body whose wall can be flowed through by the fluid to be purified in radial direction in relation to the longitudinal axis of the filter medium body, with at least one end disk at an end face of the round filter element.

US 2013/0232934 A1 discloses a round filter element that can be used in an air filter in the intake manifold of an internal combustion engine and comprises a hollow cylindrical filter medium body having arranged at its exterior side a support grid for supporting the filter medium body. The externally positioned circumferential wall surface of the filter medium body is provided with a V-shaped cut in which a rod-shaped positioning element is inserted which, in the installed state in the receiving filter housing, prevents an accidental rotation about the filter element axis. The V-shaped cut is provided with flow-tight walls.

WO 2016/020744 A1 describes a filter device with a round filter element in a receiving filter housing wherein the round filter element is closed at oppositely positioned end faces by an end disk, respectively. A receiving opening for a housing-associated positioning pin that is arranged at the bottom of the receiving filter housing is introduced into the end disk positioned at the lower end.

SUMMARY OF THE INVENTION

It is an object of the invention to configure with simple constructive measures a round filter element in such a way that the round filter element is reliably accommodated in the filter housing in the installed state.

This object is solved according to the invention by a round filter element of the aforementioned kind wherein the end disk comprises a shaped body that axially delimits the inwardly positioned flow space that is radially enclosed by the filter medium body and further comprises a sealing disk arranged externally at the shaped body that covers the shaped body and the end face of the filter medium body, wherein in the shaped body a receiving depression that is flow-tight relative to the inwardly positioned flow space and in the sealing disk a receiving opening, aligned with the receiving depression, are provided for receiving a support element.

The dependent claims provide expedient further embodiments.

The round filter element according to the invention is preferably used for gas filtration, for example, for filtration of air, in particular in the intake manifold of an internal combustion engine of a vehicle. The filter element comprises a filter medium body embodied as a hollow body whose wall is flowed through by the fluid to be purified. The filter medium body encloses an inwardly positioned flow space which in radial direction—in relation to the longitudinal axis of the filter medium body and of the round filter element—is delimited by the inner wall of the filter medium body. The filter medium body is flowed through in radial direction by the fluid to be purified, preferably radially from the interior to the exterior, so that the inwardly positioned flow space adjoins the raw side of the filter medium body and the exterior side of the filter medium body forms the clean side through which the purified fluid exits radially. At least at one axial end face, preferably at both oppositely positioned axial end faces, the filter medium body is covered flow-tightly by end disks.

The round filter element in the filter medium body can be configured hollow cylindrical or non-rotation-symmetrical, for example, can have an oval or ovalized cross-sectional shape wherein also cross-sectional shapes with parallel longitudinal sides and semicircular narrow sides are conceivable, optionally with convexly or concavely outwardly or inwardly curved longitudinal sides. In preferred embodiment, the inner wall and the outer wall of the filter medium body extend concentrically to each other so that the filter medium body has a constant radial thickness, even though embodiments are also possible in which the filter medium body has a changing radial thickness along its circumference.

An end disk at an end face of the round filter element is of a two-part configuration and comprises a shaped body as well as a sealing disk. The shaped body delimits the inwardly positioned flow space in the filter medium body in axial direction. The sealing disk is arranged at the exterior side of the shaped body—at the side which is axially facing away from the inwardly positioned flow space—and covers the shaped body as well as the end face of the filter medium body. The sealing disk provides for a flow-tight axial closure of the filter medium body.

A receiving depression is introduced into the shaped body which is flow-tight relative to the inwardly positioned flow space; the sealing disk comprises a receiving opening which is aligned with the receiving depression in the shaped body. A support element can project into the receiving opening in the sealing disk and extend into the receiving depression in the shaped body. The support element enables support and positioning of the round filter element in the receiving filter housing in radial direction and/or in axial direction. The support is realized in an advantageous manner in radial direction at a distance to the filter medium body and comprises thus a smaller radial distance from the longitudinal axis than the inner wall of the filter medium body. At the same time, the flow seal-tightness between the inwardly positioned flow space in the filter medium body and the surroundings is ensured even when the shaped body itself at the end face of the inwardly positioned flow space is not embodied to be flow-tight.

The receiving depression in the shaped body and the receiving opening in the sealing disk are embodied to be aligned with each other wherein in preferred embodiment the receiving opening in the sealing disk is arranged within the circumferential rim of the receiving depression in the shaped body. The sealing disk is resting on the circumferential rim of the receiving depression, in particular in a flow-tight manner, so that the receiving depression and the receiving opening are embodied to be open outwardly but are closed off in a flow-tight manner relative to the inwardly positioned flow space. Flow leakage between the inwardly positioned flow space via the shaped body and the sealing disk toward the surroundings is prevented.

According to an advantageous embodiment, the bottom of the receiving depression is positioned axially within the flow space in the filter medium body. Optionally, it can be expedient that the entire receiving depression is positioned axially inside the flow space. This embodiment has the advantage that no additional installation space is required for configuring the receiving depression in the shaped body. The outer contour of the round filter element remains unchanged despite the receiving depression.

According to a further advantageous embodiment, the receiving depression in the shaped body has an open cross-sectional area that is greater than the open cross-sectional area of the receiving opening in the sealing disk. The receiving depression comprises advantageously a free cross-sectional area that is by at least 50%, at least 100% or at least 200%, larger than the open cross-sectional area of the receiving opening in the sealing disk. The receiving opening in the sealing disk is positioned preferably at a distance from the outer rim of the sealing disk and, in relation to the receiving depression, is positioned in such a way that the receiving opening is positioned completely inside of the circumferential rim of the receiving depression so that the sealing disk is resting on the circumferential rim of the receiving depression.

According to yet another advantageous embodiment, in the shaped body a plurality of receiving depressions and in the sealing disk a plurality of corresponding receiving openings for receiving a respective support element are provided. This enables a uniform symmetric support or positioning of the round filter element in the receiving filter housing.

According to a further advantageous embodiment, the shaped body is configured as a plastic component that can be produced in particular by injection molding. At the end face of the inwardly positioned flow space, the shaped body can be embodied, as needed, as one piece together with the support grid or support cage which is located at the inner side or at the outer side of the filter medium body.

The sealing disk is preferably manufactured of polyurethane and can be produced in a casting process and, in doing so, can be joined with the shaped body and the filter medium body. The receiving openings in the sealing disk can be introduced into the sealing disk either already during the casting process or subsequent to the casting process. The sealing disk extends across the end face of the filter medium body and seals correspondingly the end face of the filter medium body. Advantageously, the sealing disk extends substantially or completely across the end face of the inwardly positioned flow space in the filter medium body.

Advantageously, the shaped body and the sealing disk form a closed end disk at the round filter element. In this embodiment, the end disk with the shaped body and the sealing disk closes off the filter medium body as well as the inwardly positioned flow space seal-tightly in axial direction.

In an alternative embodiment, it is also possible that the end disk with the shaped body and the sealing disk comprises a continuous axial cutout into which a component is inserted in a flow-tight manner, for example, a flow pipe, wherein between the component passing through inwardly and the end disk, in particular the sealing disk, flow seal-tightness is present.

According to a further advantageous embodiment, an open end disk is located at the oppositely positioned end face and covers the end face of the filter medium body at this side in a flow-tight manner but leaves open a flow opening into the inwardly positioned flow space.

According to a further advantageous embodiment, a further receiving opening is introduced into the rim region of the sealing disk and also serves for receiving a support element. This further receiving opening is preferably open radially in outward direction and thus formed like a notch or radial depression. This receiving opening arranged in the rim region of the sealing disk is aligned preferably with a recess in the shaped body which extends in particular radially from the exterior into the filter medium body and preferably is embodied flow-tightly in order to preclude leakage flows via the recess. The recess is preferably a component of the shaped body and is comprised further preferred of the same material as the shaped body, in particular plastic material. One or a plurality of such further receiving openings and corresponding inwardly projecting recesses of the shaped body can be additionally or alternatively provided to the afore described receiving openings in accordance with the invention.

The filter medium body, according to a further advantageous embodiment, can be embodied as a folded filter whose filter folds comprise a length extension in axial direction of the round filter element. In the embodiment with the recess which is embodied as one piece together with the shaped body, the recess extends into the flow space between neighboring filter folds of the filter medium body.

The invention furthermore relates to a filter device with the earlier described round filter element and with a filter housing for receiving the round filter element. The support element, which passes in the mounted state through the receiving opening in the sealing disk and projects into the receiving depression in the shaped body, is located at a housing part of the filter housing according to an advantageous embodiment. The support element is arranged, for example, at the bottom of a filter base housing into which the round filter element is inserted and onto which a housing cover can be placed after insertion of the round filter element.

In a further advantageous embodiment, the support element is provided at a secondary filter element that is advantageously arranged downstream of the round filter element in flow direction. The secondary filter element is arranged at the end face of the round filter element at which the end disk with the shaped body and the sealing disk is arranged. The secondary filter element is carrier of the support element that passes through the receiving opening in the sealing disk and projects into the receiving depression in the shaped body. The secondary filter element comprises a secondary filter medium body at which the secondary filtration of the fluid takes place, wherein a support body can optionally be arranged at the secondary filter medium body and the support element, which is correlated with the receiving opening and the receiving depression, can be arranged at the support body of the secondary filter element.

For assembly, first the secondary filter element is inserted into the filter housing; in this context, the secondary filter element is supported at the bottom of the receiving filter housing. Subsequently, the round filter element is inserted wherein, simultaneously with the insertion of the round filter element, the support element at the secondary filter element engages the receiving opening in the sealing disk and the receiving depression in the shaped body at the round filter element. The support and positioning in axial direction and/or in radial direction is realized through the support element at the secondary filter element and further through the secondary filter element at the filter housing.

The support element is embodied as a support pin, for example.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
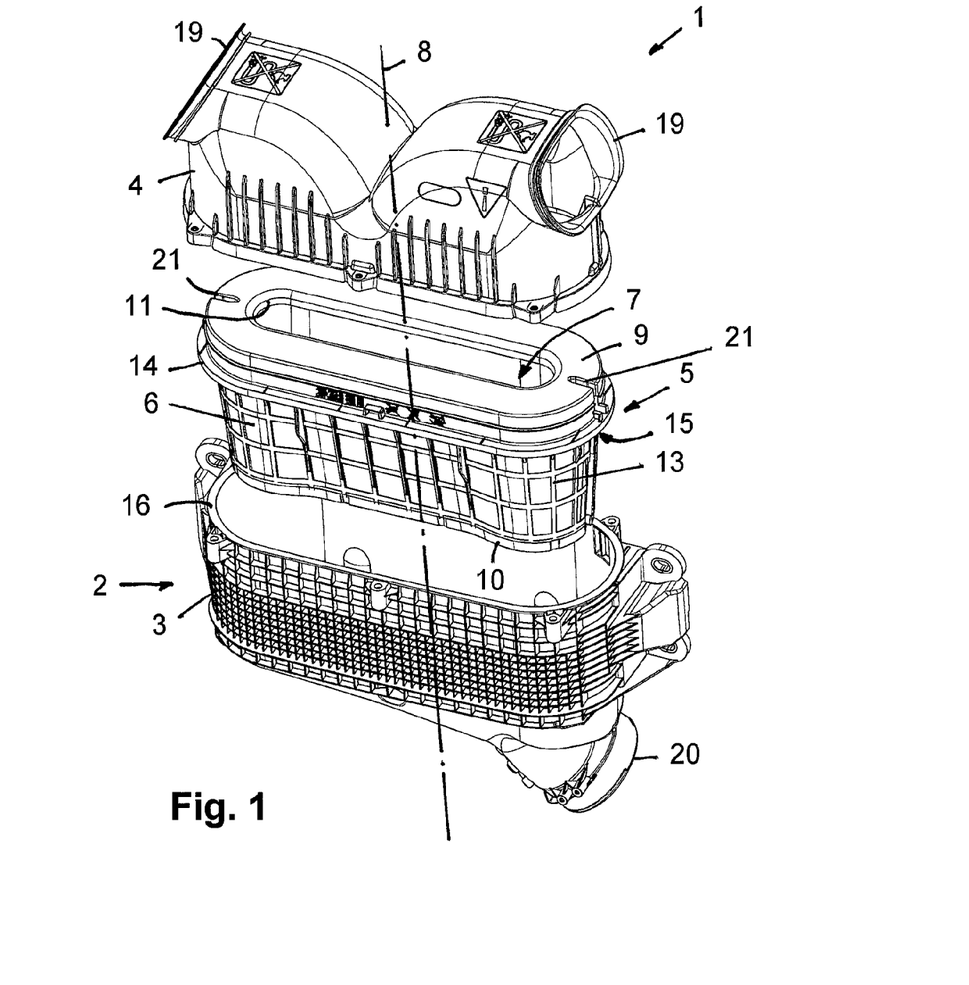
FIG. 1 shows in exploded illustration a filter device for gas filtration, with a filter base housing, a round filter element, and a housing cover.

In FIG. 1, a filter device 1 is illustrated that is used preferably for gas filtration, in particular for air filtration in the intake manifold of an internal combustion engine. The filter device 1 comprises a filter housing that is comprised of a filter base housing 3 and a housing cover 4 and a round filter element 5 that is insertable into the filter base housing 3. The housing cover 4 closes off the receiving space in the filter base housing 3 for receiving the round filter element 5.

The round filter element 5 comprises a filter medium body 6 where the filtration of the fluid to be purified takes place. Corresponding to the embodiment of the round filter element 5, the filter medium body 6 is also configured as a round element that encloses an inwardly positioned flow space 7 into which the fluid to be purified is supplied. The fluid is supplied axially, in relation to the longitudinal axis 8 of the filter element 5 and of the filter device 1, into the flow space 7. Subsequently, the fluid flows through the wall of the filter medium body 6 radially from the interior to the exterior. Accordingly, the inner wall of the filter medium body 6 forms the raw side and the outer wall the clean side.

The filter element 5 and the filter medium body 6 have a greatly ovalized shape with two parallel extending longitudinal sides and semicircular narrow sides. Also, the filter element 5 comprises a conical base shape in which the axially oppositely positioned end faces of the filter element 5 are differently sized and have a differently sized outer circumference. The axial end faces of the filter medium body 6 are covered by a respective end disk 9, 10 in a flow-tight manner wherein the end disk 9 at the larger end face of the filter element 5 is embodied open and comprises a flow opening 11 through which the raw fluid can flow into the inwardly positioned flow space 7. The oppositely positioned end disk 10, on the other hand, is of a closed configuration so that the inwardly positioned flow space 7 is axially closed at this side.

At the outer wall of the filter medium body 6, a support grid 13 is provided that is manufactured in particular of plastic material and is embodied separate from the end disks 9 and 10. The support grid 13 supports the filter medium body 6 at its outer wall in radial direction. Due to the radial flow through the filter medium body 6 from the interior to the exterior, a pressure is created that is acting outwardly in the filter medium body 6 and is absorbed by the support grid 13. This ensures that the filter medium body 6 does not deform due to the pressure of the fluid flowing through it.

Adjacent to the end disk 9 in which the flow opening 11 for introducing of the raw fluid is provided, a seal carrier 14 is provided which is a carrier of the sealing element 15. The seal carrier 14 is embodied as an annular circumferentially extending carrier wall which preferably is embodied as one piece together with the support grid 13. The sealing element 15 is designed as a sealing ring that is preferably inserted into a receiving groove in the end face of the carrier wall 14, wherein the receiving groove is embodied open toward the end disk 10. Accordingly, the sealing element 15 is facing away from the end disk 9 and facing the oppositely positioned end disk 10. In the mounted state, the sealing element 15 is resting on a circumferentially extending end face edge 16 of the wall of the receiving filter base housing 3.

Two lateral, diametrically oppositely positioned flow openings 19 are provided in the housing cover 4 through which the raw fluid can flow radially into the filter device 1. By means of a flow opening 20, which is provided in the bottom of the filter base housing 3, the purified fluid can be discharged from the filter device 1.

Figure 2:
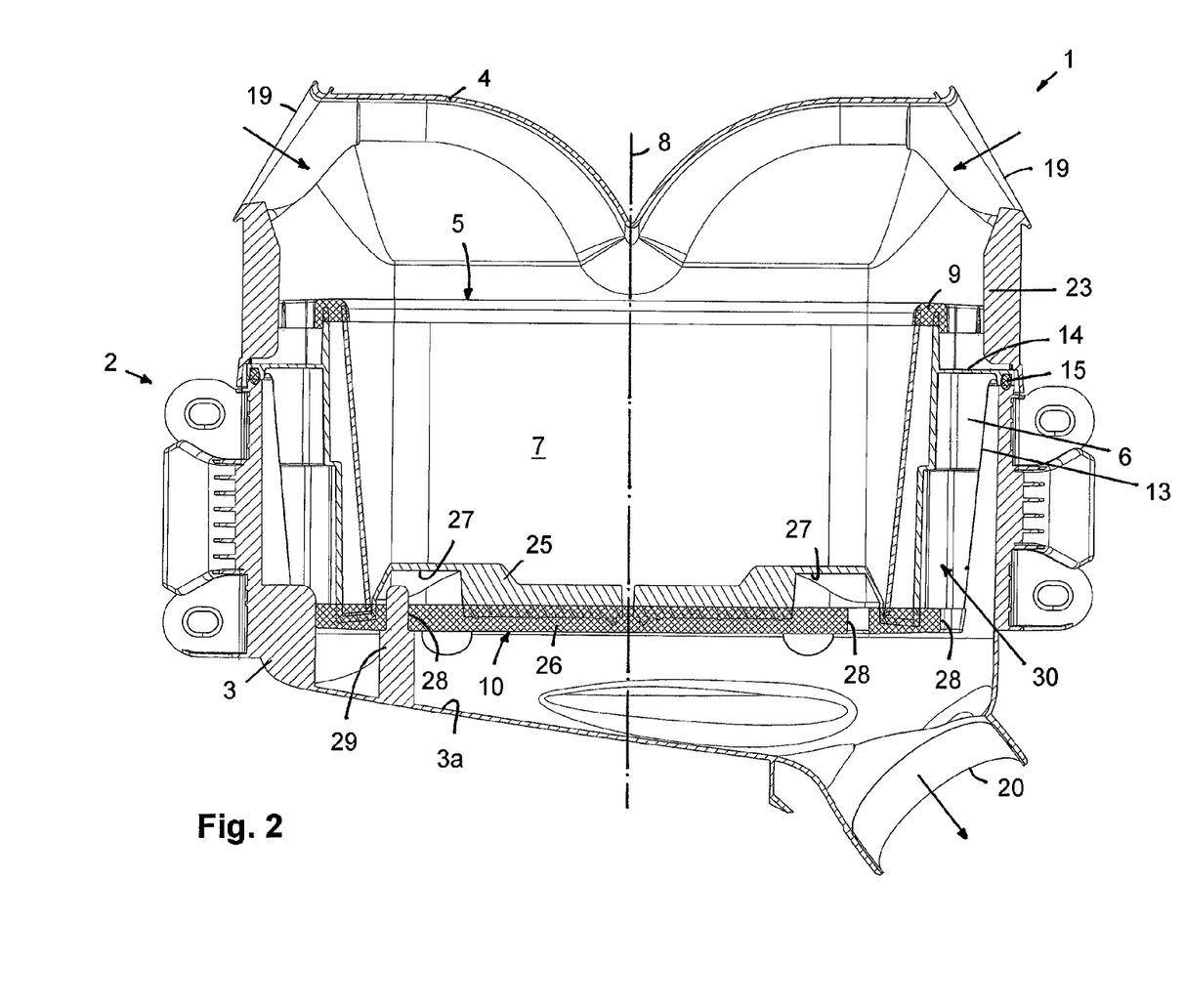
FIG. 2 shows a section lengthwise through the filter device according to FIG. 1, with an illustration of a bottom end disk at the filter element, comprised of a shaped body and a sealing disk, wherein a housing-associated support element projects through a receiving opening in the sealing disk and projects into a receiving depression in the shaped body.
Figures 4, 5:
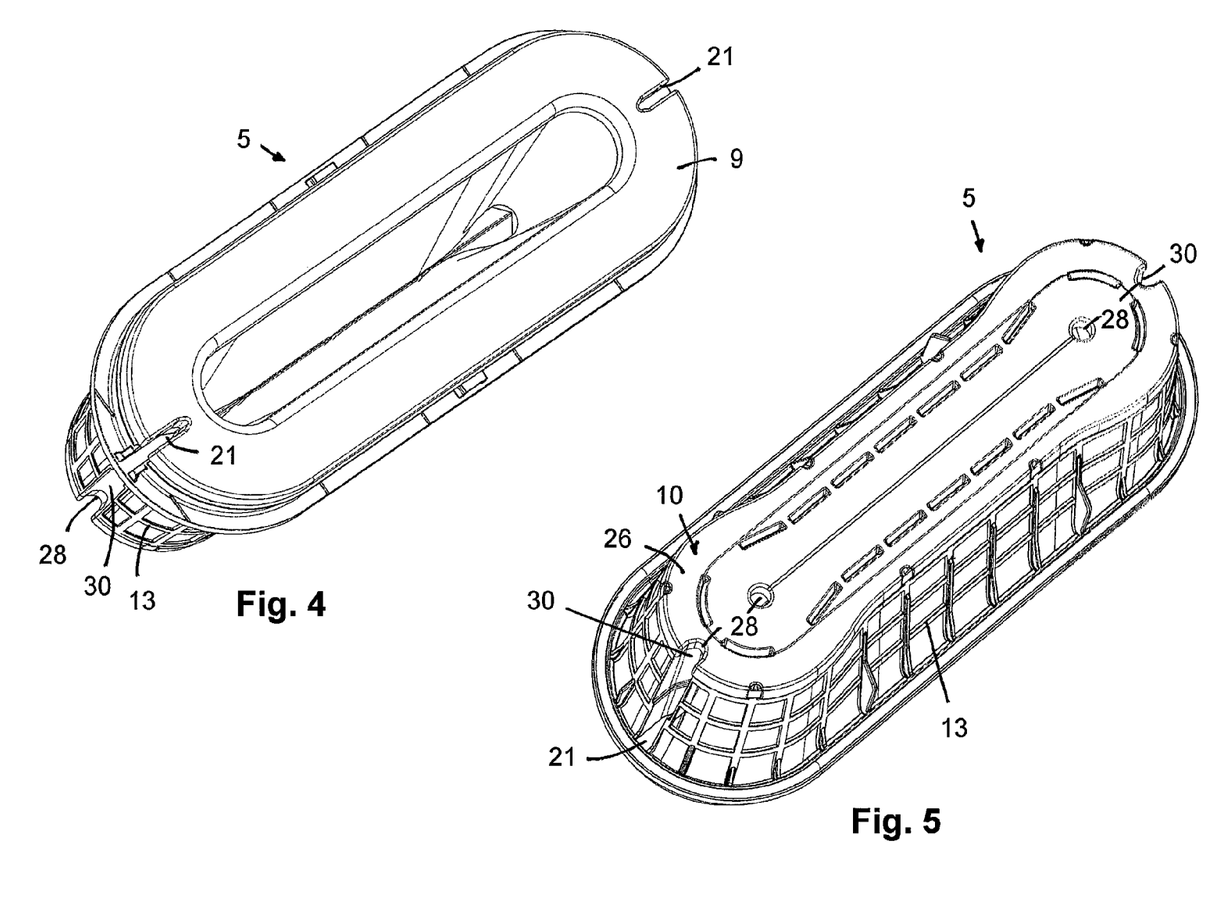
FIG. 4 shows in perspective view the round filter element from above with open end disk.
FIG. 5 shows the round filter element in a view from below with closed end disk.

As can be taken from FIG. 1 in connection with FIG. 2 and FIG. 4, in the end disk 9 at the top, which is arranged neighboring the annular circumferentially extending sealing carrier 14, a cutout 21 is provided in the region of the two oppositely positioned semicircular narrow sides, respectively. This cutout 21 permits axial insertion of a counter positioning element 23, arranged at the inner side of the housing cover 4 (FIG. 2), through the cutout 21 into a correlated positioning element that is a component of the filter element 5 and is designed, for example, as a wedge-shaped elongate body which extends from the circumferentially extending seal carrier 14 radially in inward direction. The seal carrier 14 is resting against the radial outer side of the filter medium body 6; the wedge-shaped positioning element projects radially into the filter medium body 6 which is embodied as a folded filter with a plurality of filter folds.

The bottom end disk 10 which is of a closed configuration is of a two-part configuration and comprises a shaped body 25 of plastic material and a sealing disk 26 of a sealing material such as, for example, polyurethane (PUR). The shaped body 25 and the sealing disk 26 close off the inwardly positioned flow space 7 positioned inside the filter medium body 6 in axial direction downwardly in the direction toward the bottom 3a of the filter base housing 3 in a flow-tight manner. The shaped body 25 of plastic material is advantageously embodied as one piece together with the support element 13 at the outer side of the filter medium body 6. The shaped body 25 forms a disk or plate at the bottom end face of the filter medium body 6; it does not project, or at least not substantially, in particular axially past the end face of the filter medium body 6. The sealing disk 26 is positioned at the outwardly positioned side of the shaped body 25 and extends also across the end face of the filter medium body 6 so that the filter medium body 6 is sealed by the sealing disk 26 in axial direction in a flow-tight manner. The sealing disk 26 can be cast onto the shaped body 25 as well as onto the end face of the filter medium body 6.

Receiving depressions 27 whose open side is facing the sealing disk 26 are introduced into the shaped body 25. Receiving openings 28 in the sealing disk 26 correspond with the receiving depressions 27. The open cross-sectional area of the receiving openings 28 in the sealing disk 26 is significantly smaller than the open cross-sectional area of the receiving depressions 27 in the shaped body 25 wherein the receiving openings 28 are located at a lateral distance from the circumferential rim of the receiving depressions 27 so that the material of the sealing disk 26 is resting on the circumferential rim of the receiving depressions 27.

At the bottom 3a of the filter base housing 3, a support element 29 is formed that comprises the shape of a support pin and extends in axial direction upwardly. The support element 29 projects through the receiving opening 28 in the sealing disk 26 and into the receiving depression 27 in the shaped body 25. The end face section of the support element 29 does not contact the walls of the receiving depression 27. A support shoulder is formed at the support element 29 and a narrow support pin projects past it, wherein the sealing disk 26 is axially supported at the support shoulder of the support element 29. In addition, a radial support and positioning of the sealing disk 26 is provided at the pin of the support element 29 which projects through the receiving opening 28.

Optionally, a plurality of support elements 29 can be provided which project into a receiving opening 28 and a receiving depression 27, respectively.

In the rim region, a further receiving opening 28 is introduced into the sealing disk 26 and is aligned with a recess 30 which is formed as one piece together with the shaped body 25 and extends into the filter medium body 6. The recess 30 is located in the radial outwardly positioned rim region of the round filter element 5 and is positioned between folds of the filter medium body. The recess 30 is sealed relative to the surrounding regions of the filter medium body 6 in a flow-tight manner. The receiving opening 28 in the rim region of the sealing disk 26 is aligned with the recess 30 in the shaped body 25 so that it is possible to pass a support element through the rim-side receiving opening 28 until the recess 30 is reached.

Figure 3:
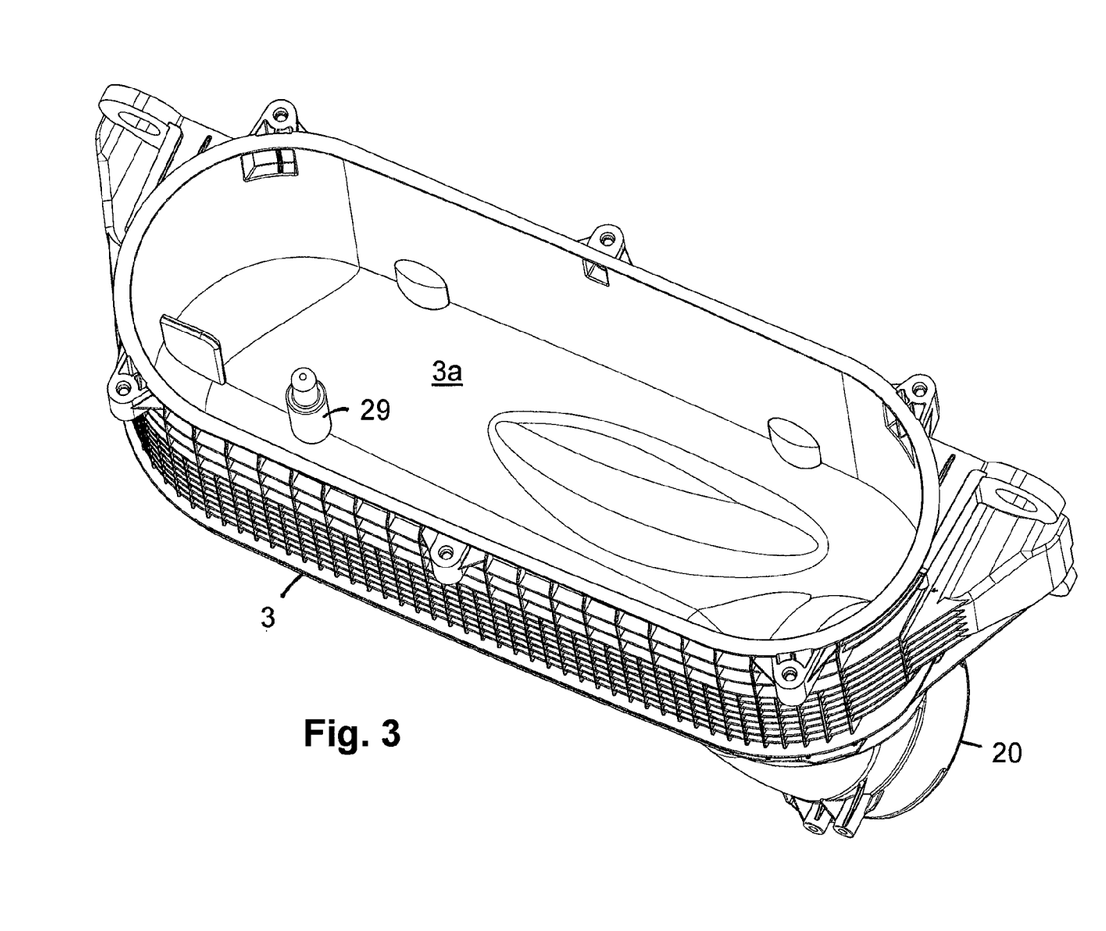
FIG. 3 shows a perspective individual illustration of the filter base housing.

In FIG. 3, the filter base housing 3 is shown in perspective illustration. The support element 29 is formed integrally at the inwardly positioned bottom 3a of the filter base housing 3 and extends in axial direction—in relation to the longitudinal axis of the filter element and of the filter device. The upper part of the support element 29 is embodied as a support pin with reduced diameter so that relative to the bottom part a circumferentially extending support collar is formed at which the sealing disk 26 of the round filter element can be supported.

In FIGS. 4 and 5, the round filter element 5 is illustrated in a view from above (FIG. 4) and from below (FIG. 5). The recess 30 which is aligned with the rim-associated receiving opening 28 in the sealing disk 26 continues axially all the way to the cutout 21 in the upper end disk 9.

Figure 6:
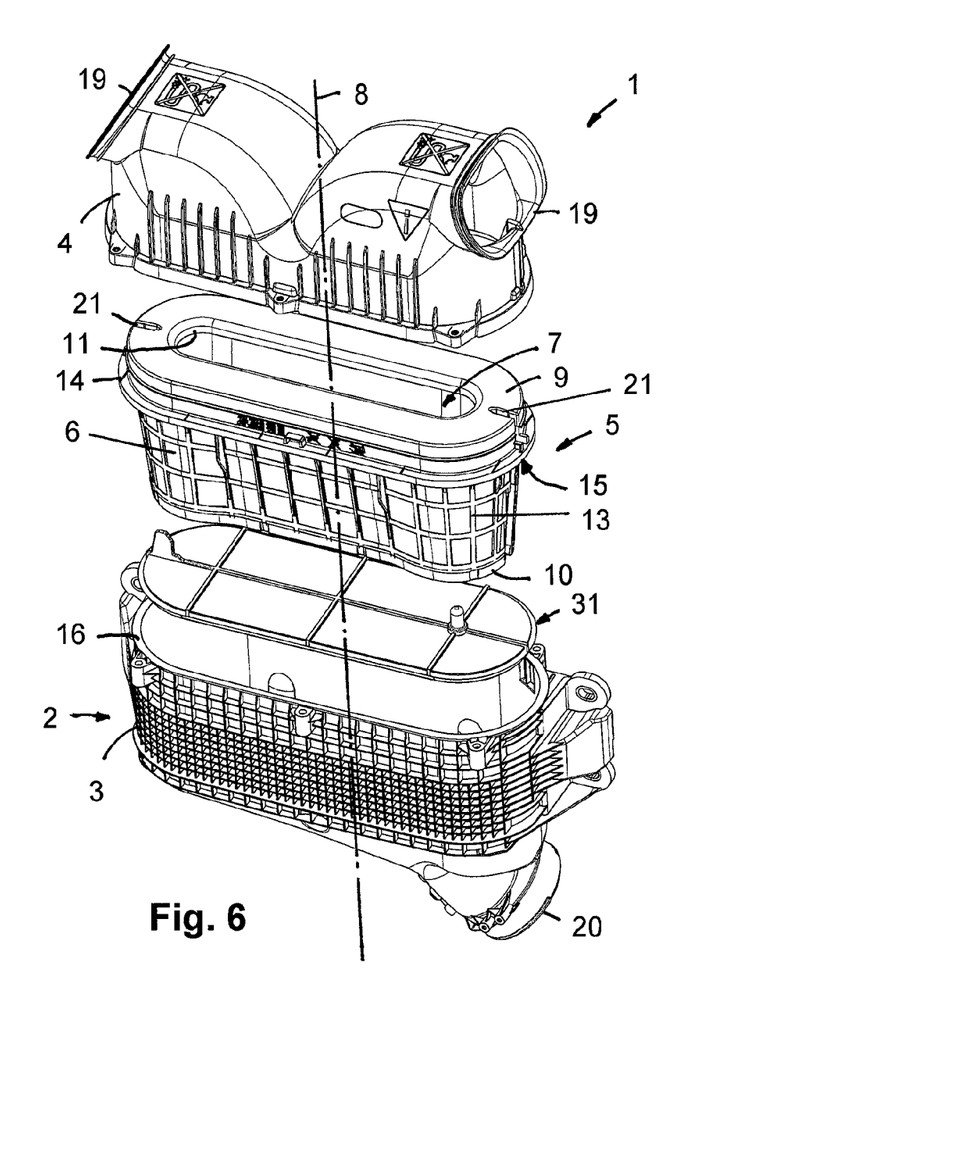
FIG. 6 shows in an embodiment variant a filter device in exploded illustration which, in contrast to FIG. 1, is provided below the round filter element with a downstream secondary filter element at which the support elements are arranged.
Figure 7:
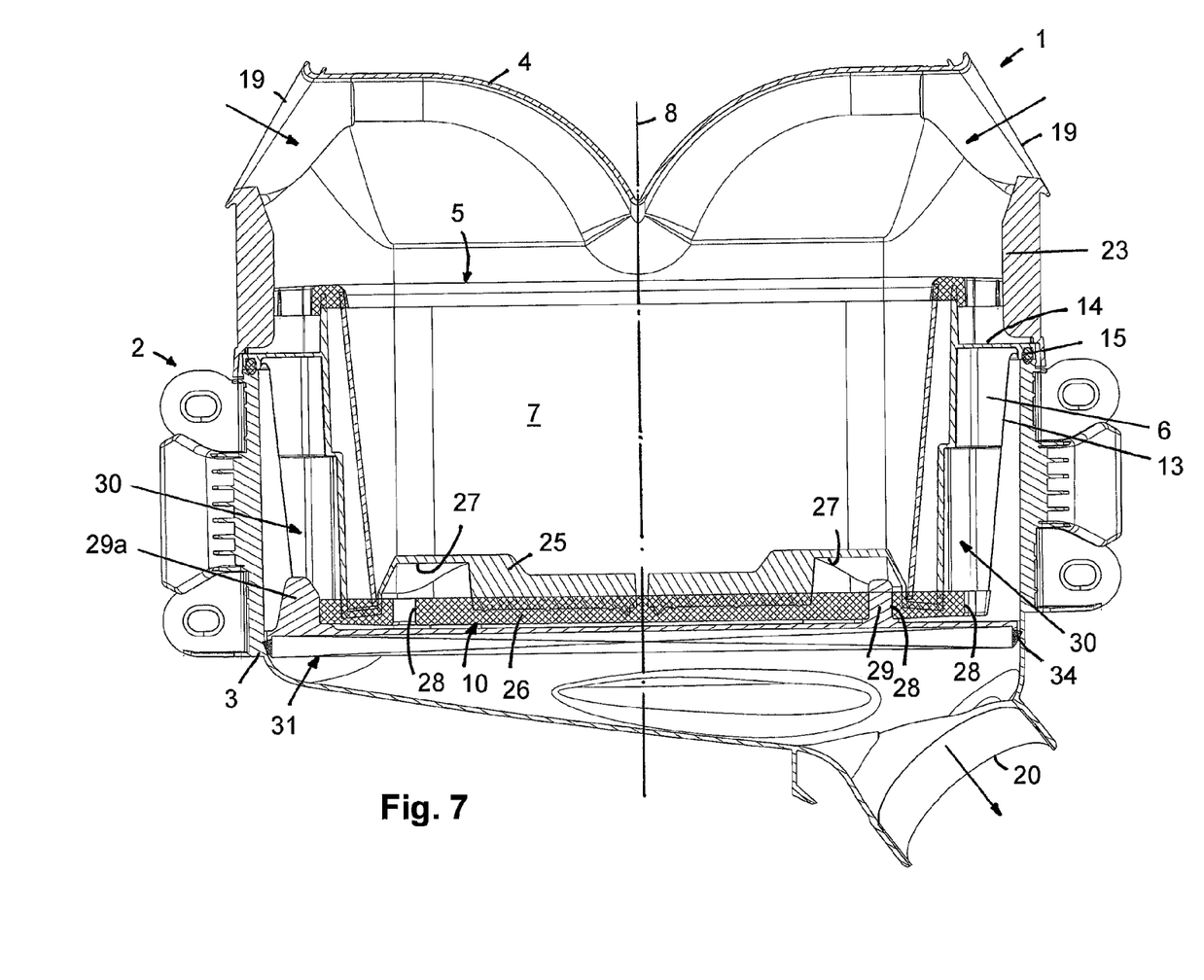
FIG. 7 shows a section lengthwise through the filter device according to FIG. 6.
Figure 8:
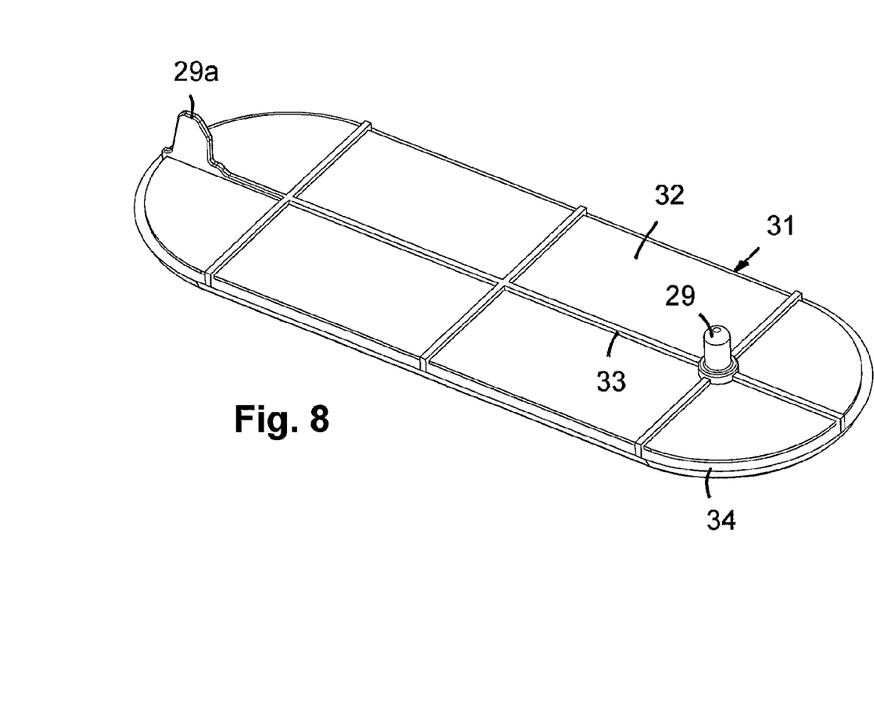
FIG. 8 shows the secondary filter element in individual illustration.

In FIGS. 6 to 8, a further embodiment of a filter device 1 is illustrated which is substantially identical to the filter device according to the first embodiment. In the present embodiment, the filter device 1 comprises however additionally a secondary filter element 31 that is shown in FIG. 6 in an individual illustration. The secondary filter element 31 is arranged downstream of the round filter element 5 in flow direction so that the fluid first passes through the round filter element 5 and subsequently through the secondary filter element 31. The latter is configured disk-shaped or plate-shaped and comprises a corresponding secondary filter medium body 32 at which a support body 33 in the form of a support grid of plastic material is arranged. At the outer circumference, a circumferentially extending sealing element 34 is provided which, in the installed state of the secondary filter element 31, is contacting flow-tightly the inner wall of the receiving filter base housing 3. Accordingly, the fluid, after flowing through the round filter element 5, is forced to flow through the secondary filter element 31 in axial direction from top to bottom.

The support body 33 is carrier of the support element 29 which extends through a cutout 28 in the sealing disk 26 and projects into the receiving depression 27 in the shaped body 25.

In addition, a further support element 29a in the form of a blade is provided at the support body 33 in the rim region and projects into the rim-side recess 30 which is formed as one piece together with the shaped body 25. The blade-shaped support element 29a supports the rim region of the sealing disk 26 in radial direction.

What is claimed is:

1. A round filter element comprising:
    a filter medium body configured to be flowed through by a fluid to be purified in a radial direction in relation to a longitudinal axis of the filter medium body, wherein the filter medium body radially surrounds the longitudinal axis which extends axially through oppositely positioned first and second axial end faces of filter medium body;
        wherein an inwardly positioned flow space is arranged on the longitudinal axis and is radially surrounded and enclosed by the filter medium body,
        wherein axial, as used herein, is a direction of the longitudinal axis, and
        wherein radial, as used herein, is a direction transverse to the longitudinal axis;
    an end disk arranged at and closing off the first axial end face of the filter medium body, the end disk having a two-part configuration comprising:
        a shaped body extending radially across and axially delimiting the inwardly positioned flow space at the first axial end face, the spaced body including:
            a receiving depression formed into to the shaped body and opening only to an axial outer side of the shaped body, the receiving depression closed flow-tight relative to the inwardly positioned flow space; and
        a sealing disk of a sealing material arranged directly on the axial outer side of the shaped body, the sealing disk covering the shaped body and closing off the first axial end face of the filter medium body;
            wherein the sealing disk is made of a different material than the shaped body;
            wherein the sealing disk comprises
                a first receiving opening extending axially through the sealing disk and opening into the receiving depression of the shaped body;
        wherein the receiving depression of the shaped body and the first receiving opening of the sealing disk are configured to receive a support element.

2. The round filter element according to claim 1, wherein the receiving depression of the shaped body comprises
- a bottom wall positioned axially within the inwardly positioned flow space and closing the receiving depression flow-tight relative to the inwardly positioned flow space.

3. The round filter element according to claim 1, wherein the receiving depression of the shaped body comprises
- an open cross-sectional area and
- the first receiving opening of the sealing disk comprises an open cross- sectional area,
- wherein the open cross-sectional area of the receiving depression of the shaped body is larger than the open cross-sectional area of the first receiving opening of the sealing disk.

4. The round filter element according to claim 1, wherein the shaped body comprises
- a plurality of said receiving depression and the sealing disk comprises
- a plurality of said first receiving opening.

5. The round filter element according to claim 1, wherein the shaped body is a plastic component.

6. The round filter element according to claim 5, wherein the plastic component is an injection molded plastic part.

7. The round filter element according to claim 1, wherein
- the sealing disk is comprised of polyurethane and produced by a casting process,
- wherein the sealing disk is joined to the shaped body and the filter medium body by the casting process.

8. The round filter element according to claim 1, wherein
- the sealing disk, adjacent to a rim region of the sealing disk, comprises a second receiving opening and
- wherein the shaped body comprises a flow-tight recess extending into the filter medium body,
- wherein the second receiving opening of the sealing disk is aligned with the flow- tight recess of the shaped body.

9. The round filter element according to claim 1, wherein p1 the filter medium body comprises a folded configuration.

10. The round filter element according to claim 1, wherein the round filter element comprises
- a round cross-sectional shape, an oval cross-sectional shape or an ovalized cross-sectional shape.

11. A filter device comprising:
- the round filter element according to claim 1; and
- a filter housing configured to receive the round filter element.

12. The filter device according to claim 11, wherein
- the filter housing comprises a housing part,
- wherein the support element received in the receiving depression of the shaped body and in the first receiving opening of the sealing disk is arranged at the housing part.

13. The filter device according to claim 12, wherein the filter housing comprises
- a filter base housing into which the round filter element is inserted,
- wherein the housing part is the bottom of the filter base housing.

14. The filter device according to claim 11, further comprising
- a secondary filter element arranged adjacent to the end disk of the round filter element in the filter housing,
- wherein the support element received in the receiving depression of the shaped body and in the first receiving opening of the sealing disk is arranged at the secondary filter element.

15. The filter device according to claim 14, wherein the secondary filter element comprises
- a secondary filter medium body and
- further comprises a support body arranged at the secondary filter medium body,
- wherein the support element is arranged at the support body.

16. The round filter element according to claim 1, further comprising:
- a support grid arranged on a radially outer side of the filter medium body,
  - wherein the support grid extends axially between the oppositely positioned first and second axial end faces of filter medium body;
- an annular seal carrier wall formed on the support grid and projecting radially outwardly from the support grid, the annular seal carrier wall arranged axially between and spaced axially away from the first and the second axial end faces of filter medium body; and
- a sealing ring arranged on a radially outer rim of the annular seal carrier wall and configured to seal against an interior of a filter housing when in an installed state.

* * * * *